(12) United States Patent
Kothe et al.

(10) Patent No.: US 12,006,740 B2
(45) Date of Patent: Jun. 11, 2024

(54) MOTOR VEHICLE LOCK

(71) Applicant: Brose Schliesssysteme Gmbh & Co. Kommanditgesellschaft, Wuppertal (DE)

(72) Inventors: Markus Kothe, Velbert (DE); Josip Stefanic, Odenthal (DE)

(73) Assignee: Brose Schliesssysteme GmbH & Co. Kommanditgesellschaft, Wuppertal (DE)

( * ) Notice: Subject to any disclaimer, the term of this patent is extended or adjusted under 35 U.S.C. 154(b) by 524 days.

(21) Appl. No.: 16/331,756

(22) PCT Filed: Sep. 7, 2017

(86) PCT No.: PCT/EP2017/072437
§ 371 (c)(1),
(2) Date: Mar. 8, 2019

(87) PCT Pub. No.: WO2018/046585
PCT Pub. Date: Mar. 15, 2018

(65) Prior Publication Data
US 2019/0249466 A1    Aug. 15, 2019

(30) Foreign Application Priority Data
Sep. 9, 2016   (DE) .................... 20 2016 105 005.7

(51) Int. Cl.
*E05B 81/08*   (2014.01)
*E05B 47/00*   (2006.01)
(Continued)

(52) U.S. Cl.
CPC .......... *E05B 81/08* (2013.01); *E05B 47/0005* (2013.01); *E05B 77/28* (2013.01);
(Continued)

(58) Field of Classification Search
CPC .. E05B 81/08; E05B 47/0005; E05B 47/0006; E05B 47/0038; E05B 81/16;
(Continued)

(56) References Cited

U.S. PATENT DOCUMENTS

| 4,501,980 A | 2/1985 | Welburn | |
| 5,474,339 A * | 12/1995 | Johnson | E05B 81/06 |
| | | | 292/201 |
| 2009/0218902 A1* | 9/2009 | Mohler | H02K 21/44 |
| | | | 310/156.33 |

FOREIGN PATENT DOCUMENTS

| DE | 9213623 | 4/1994 |
| DE | 202007005001 | 11/2008 |

(Continued)

OTHER PUBLICATIONS

"German Search Report," for German Patent Application No. 202016105005.7 dated Jun. 20, 2017 (5 pages), no translation available.

(Continued)

*Primary Examiner* — Christine M Mills
*Assistant Examiner* — Yahya Sidky
(74) *Attorney, Agent, or Firm* — Pauly, DeVries Smith & Deffner LLC

(57) ABSTRACT

The disclosure relates to a vehicle lock having a locking mechanism, a lock mechanism and an electrical setting arrangement, wherein the setting arrangement has a rotor arrangement, and a stator, wherein the stator forms at least two magnetic, unlike stator poles of the stator magnet arrangement, wherein at least one of the magnet arrangements is associated with a coil arrangement, wherein by supplying current to the coil arrangement and a resulting magnetic interaction between rotor and stator, a drive torque to the rotor and thus an adjustment of the rotor can be generated in a predetermined number of actuator positions.

(Continued)

Proposed is that the rotor magnet arrangement and the stator magnet arrangement are stationarily fixed to a support section of the motor vehicle lock, and the rotor is pivotable about a rotor axis relative to the support section and relative to the rotor magnet arrangement.

20 Claims, 4 Drawing Sheets

(51) Int. Cl.
*E05B 77/28* (2014.01)
*E05B 81/16* (2014.01)
*H02K 19/10* (2006.01)
*H02K 26/00* (2006.01)
*H02K 33/16* (2006.01)
*H02K 37/04* (2006.01)
*H02K 37/12* (2006.01)

(52) U.S. Cl.
CPC ........... *E05B 81/16* (2013.01); *H02K 19/103* (2013.01); *H02K 33/16* (2013.01); *H02K 37/04* (2013.01); *H02K 37/12* (2013.01); *E05B 47/0038* (2013.01); *H02K 26/00* (2013.01)

(58) Field of Classification Search
CPC .... E05B 77/28; E05B 15/0073; Y10T 292/11; Y10T 292/1082; Y10T 292/1047; Y10S 292/23; H02K 19/103; H02K 33/16; H02K 37/04; H02K 37/12; H02K 26/00; H02K 33/18

See application file for complete search history.

(56) References Cited

FOREIGN PATENT DOCUMENTS

| | | | |
|---|---|---|---|
| DE | 112007001586 | 6/2009 | |
| DE | 102012003698 A1 * | 8/2013 | ............ E05B 77/26 |
| EP | 2886759 | 6/2015 | |
| JP | 2002097828 | 4/2002 | |
| WO | 2013127531 | 9/2013 | |
| WO | 2018046585 | 3/2018 | |

OTHER PUBLICATIONS

"International Search Report and Written Opinion," for PCT Application No. PCT/EP2017/072437 dated Dec. 8, 2017 (22 pages) with English translation.

* cited by examiner

MOTOR VEHICLE LOCK

CROSS-REFERENCE TO RELATED APPLICATIONS

This application is a national stage application under 35 U.S.C. 371 of International Patent Application Serial No. PCT/EP2017/072437, entitled "Motor Vehicle Lock," filed Sep. 7, 2017, which claims priority from German Patent Application No. DE 20 2016 105 005.7, filed Sep. 9, 2016, the disclosure of which is incorporated herein by reference.

FIELD OF THE TECHNOLOGY

The disclosure relates to a motor vehicle lock. The motor vehicle lock in question is used to produce a holding engagement between a motor vehicle door or the like with the motor vehicle body. A mechanically robust, burglar-proof and simultaneously cost-effective design is disclosed herein.

BACKGROUND

The well-known motor vehicle lock (WO 2013/127531 A1), from which the disclosure proceeds, shows a motor vehicle lock having a locking mechanism of lock latch and pawl and having a lock mechanism which can be brought into different lock states such as "unlocked", "locked" or the like. An electrical setting arrangement is provided for the adjustment of the lock mechanism in the different lock states, which setting arrangement is designed in the manner of a direct drive. The setting arrangement has a rotor having a permanent magnet arrangement and a stator having a coil arrangement. A universal applicability of the setting arrangement is ensured through the symmetry of the setting arrangement with respect to the rotor axis. However, there is still potential for optimization regarding production costs.

SUMMARY

The disclosure is based on the problem of optimizing the known motor vehicle lock from the cost point of view, without incidentally affecting the performance of the motor vehicle lock.

Essential is the fundamental consideration that the rotor does not necessarily have to move along with its associated rotor magnet arrangement with each drive movement. Rather, it has been recognized that with a suitable magnetic coupling between the rotor and the rotor magnet arrangement, a pivoting drive movement of the rotor is possible with fixed rotor magnet arrangement. Thus the rotor, which is used as the output of the setting arrangement, only has the additional function of guiding the magnetic field generated by the rotor magnet arrangement.

Specifically, it is proposed that the rotor magnet arrangement and the stator magnet arrangement are stationarily fixed to a support section of the motor vehicle lock, which is advantageously a lock housing section of the motor vehicle lock. The rotor is pivotable about a rotor axis relative to the support section and relative to the rotor magnet arrangement. By coupling the rotor to the rotor magnet arrangement, the rotor forms at least two magnetic, unlike rotor poles of the rotor magnet arrangement, which are correspondingly pivotable with the rotor about the rotor axis. In the present case, a "pole" is always understood to mean a flat, magnetically conductive section from which the magnetic field, from which the drive torque originates, can emerge.

A weight-optimized design of the rotor is possible with the proposed solution, so that, first of all, the power input required for the drive movements is correspondingly reduced. This in turn leads to a cost-effective design of the coil arrangement.

Furthermore, a good dynamic mechanical behavior of the rotor results from the weight-optimized design of the rotor, for example, since an overshoot of the rotor when racking in an actuator position is reduced. The weight-optimized design of the rotor is also advantageous in view of the crash behavior of the motor vehicle lock, since only small inertial forces act on the rotor.

Finally, a high burglar resistance results with the proposed solution, since the rotor is hardly manipulatable in its rotor position by an external magnetic field for lack of permanent magnets arranged on the rotor.

In various embodiments, the coil arrangement which can be supplied current is part of the rotor magnet arrangement, while the stator magnet arrangement has a permanent magnet arrangement. The coil arrangement can be optimally integrated in the rotor, as is shown.

An embodiment for the generation of the drive torque is in that unequal poles of the rotor on the one hand and of the stator on the other hand approach each other when racking in the respective actuator position. The resulting actuator position can be magnetically stable. This means that at least while current is supplied, the respective actuator position corresponds to the state of minimum magnetic potential energy, so that an externally caused deflection of the rotor out of the respective actuator position leads to a magnetic torque on the rotor in the respective actuator position regardless of the direction of the deflection. The magnetically stable actuator positions can therefore be racked in without the need for mechanical end stops.

The setting arrangement as such, thus in the unassembled state, can be designed such that it can rack in at least two magnetically stable actuator positions with the rotor depending on the current supply.

Further embodiments allow an adaptation of the design of the setting arrangement to the respective application. The universal applicability in favor of a cost-effective design takes a back seat here.

Various embodiments relate to a particularly compact structural design the magnetic coil of the rotor magnet arrangement is penetrated by a section of the rotor. When designing the rotor with two rotor laminations, which are magnetically coupled to each other via a coupling part aligned with the rotor axis, the rotor effectively assumes the function of a magnetic yoke, which penetrates the magnetic coil and which is pivotable about the rotor axis relative to the magnetic coil.

It follows from the above considerations that the setting arrangement can be used for setting different functional elements of the lock mechanism. In this case, the respective functional element, possibly via an intermediate gear, can be coupled to the rotor, connected to the rotor or formed by the rotor. Various embodiments show this with reference to a coupling element of a coupling arrangement of the lock mechanism.

In general, it is the case that the rotor of the setting arrangement can be an integral part of the lock mechanism, for example, a lever, in particular a coupling element, of the lock mechanism.

Various embodiments provide a motor vehicle lock having a locking mechanism, having a lock mechanism and having an electrical setting arrangement for setting different lock states of the lock mechanism, wherein the setting arrangement has a rotor arrangement, with which a rotor and a rotor magnet arrangement for generating a rotor magnetic field is associated, and a stator, with which a stator magnet arrangement for generating a stator magnetic field is associated, wherein the stator forms at least two magnetic, unlike stator poles of the stator magnet arrangement, wherein at least one of the magnet arrangements is associated with a coil arrangement that can be supplied current to generate the respective magnetic field, wherein by supplying current to the coil arrangement and a resulting magnetic interaction between the rotor and stator, a drive torque to the rotor and thus an adjustment of the rotor can be generated in a predetermined number of actuator positions, wherein, the rotor magnet arrangement and the stator magnet arrangement are stationarily fixed to a support section, in particular to a lock housing section, of the motor vehicle lock, and wherein the rotor is pivotable about a rotor axis relative to the support section and relative to the rotor magnet arrangement and forms at least two magnetic, unlike rotor poles of the rotor magnet arrangement, which are respectively pivotable about the rotor axis.

In some embodiments, the rotor magnet arrangement has the coil arrangement for generating the rotor magnetic field and the stator magnet arrangement has a permanent magnet arrangement for generating the stator magnetic field, or wherein the stator magnet arrangement has the coil arrangement for generating the stator magnetic field and the rotor magnet arrangement has a permanent magnet arrangement for generating the rotor magnetic field.

In some embodiments, when current is supplied to the coil arrangement, unlike poles of the rotor on the one hand and of the stator on the other hand approach each other up to a respective magnetic gap by an adjustment of the rotor and thereby close a magnetic circuit associated with the respective actuator position for the superposition field of rotor field and stator field.

In some embodiments, different actuator positions are associated with different magnetic circuits for the superposition field of rotor field and stator field.

In some embodiments, in each actuator position when the current supply is switched off, the magnetic field of the permanent magnet arrangement, in particular the stator field, passes through the magnetic circuit associated with the respective actuator position, so that the respective actuator position is a magnetically stable actuator position even when the current supply is switched off.

In some embodiments, the setting arrangement as such, depending on the current supply to the coil arrangement, can rack in at least two, such as at least three, magnetically stable actuator positions by the resulting drive torque.

In some embodiments, the setting arrangement as such, when opposite current is supplied, racks in exactly two magnetically stable actuator positions by the resulting drive torque.

In some embodiments, the rotor forms three rotor poles of the rotor magnet arrangement, of which only two rotor poles are like and wherein the stator forms two unlike stator poles of the stator magnet arrangement, such as the angular distance between the stator poles with respect to the rotor axis corresponds to the angular distance between two juxtaposed rotor poles.

In some embodiments, the rotor poles are arranged distributed over at least part of the circumference of the rotor, and/or the rotor poles of the rotor magnet arrangement are arranged distributed over an angular range of less than 180°, such as less than 120°, with respect to the rotor axis.

In some embodiments, the stator poles of the stator magnet arrangement are arranged distributed along at least part of a movement path of the rotor, such as the stator poles of the stator magnet arrangement are arranged distributed along only a part of a movement path of the rotor, such as the stator poles of the stator magnet arrangement are arranged distributed over an angular range of less than 180°, such as less than 120°, with respect to the rotor axis.

In some embodiments, the stator magnet arrangement is designed and/or arranged asymmetrically with respect to the rotor axis, and/or the rotor magnet arrangement is designed and/or arranged asymmetrically with respect to the rotor axis.

In some embodiments, the rotor has a rotor lamination arrangement which is magnetically coupled to the rotor magnet arrangement and which forms the rotor poles, such as the rotor lamination arrangement has two rotor laminations for the formation of the unlike rotor poles, which rotor laminations are magnetically coupled to each another via a coupling part, in particular a coupling pin, aligned on the rotor axis, such as the rotor laminations each have a base body which extends essentially transversely to the rotor axis and from which the rotor poles are bent like a claw.

In some embodiments, the coil arrangement has at least one magnetic coil of the rotor magnet arrangement stationarily fixed to the support section, which magnetic coil is aligned coaxially with the rotor axis, such as the coupling part penetrates the magnetic coil of the rotor magnet arrangement, such as the two rotor laminations of the rotor are arranged on opposite end faces of the magnetic coil.

In some embodiments, stator has a stator lamination arrangement which is magnetically coupled to the stator magnet arrangement and which forms the stator poles, such as the permanent magnet arrangement of the stator magnet arrangement has a permanent magnet which is magnetically coupled to the stator lamination arrangement, such as the stator lamination arrangement has two stator laminations which are each connected to a pole of the permanent magnet.

In some embodiments, in the assembled state, the motor vehicle lock is coupled to an actuation handle, in particular to a door outer handle or a door inner handle and the locking mechanism, depending on the lock state of the lock mechanism, can be opened by an actuation of the actuation handle, wherein the lock mechanism has a functional element which can be brought into different functional settings to set different lock states and wherein the functional element is coupled to the rotor, such as the functional element is connected to the rotor or is formed by the rotor.

In some embodiments, the lock mechanism has a coupling arrangement for the switchable coupling of an actuating element to the locking mechanism, in particular with a locking pawl of the locking mechanism and wherein the coupling arrangement has an adjustable coupling element as a functional element, such as the coupling element has a guide surface which, at least in one position of the coupling element, deflects the actuating movement of the actuating element out of coupling engagement with the locking mechanism or into coupling engagement with the locking mechanism, such as the actuating element is always free of the coupling element prior to its actuation.

BRIEF DESCRIPTION OF THE DRAWINGS

The disclosure is explained in more detail in the following text with reference to a drawing showing only one exemplary embodiment. In the drawing

DETAILED DESCRIPTION

Figure 1:
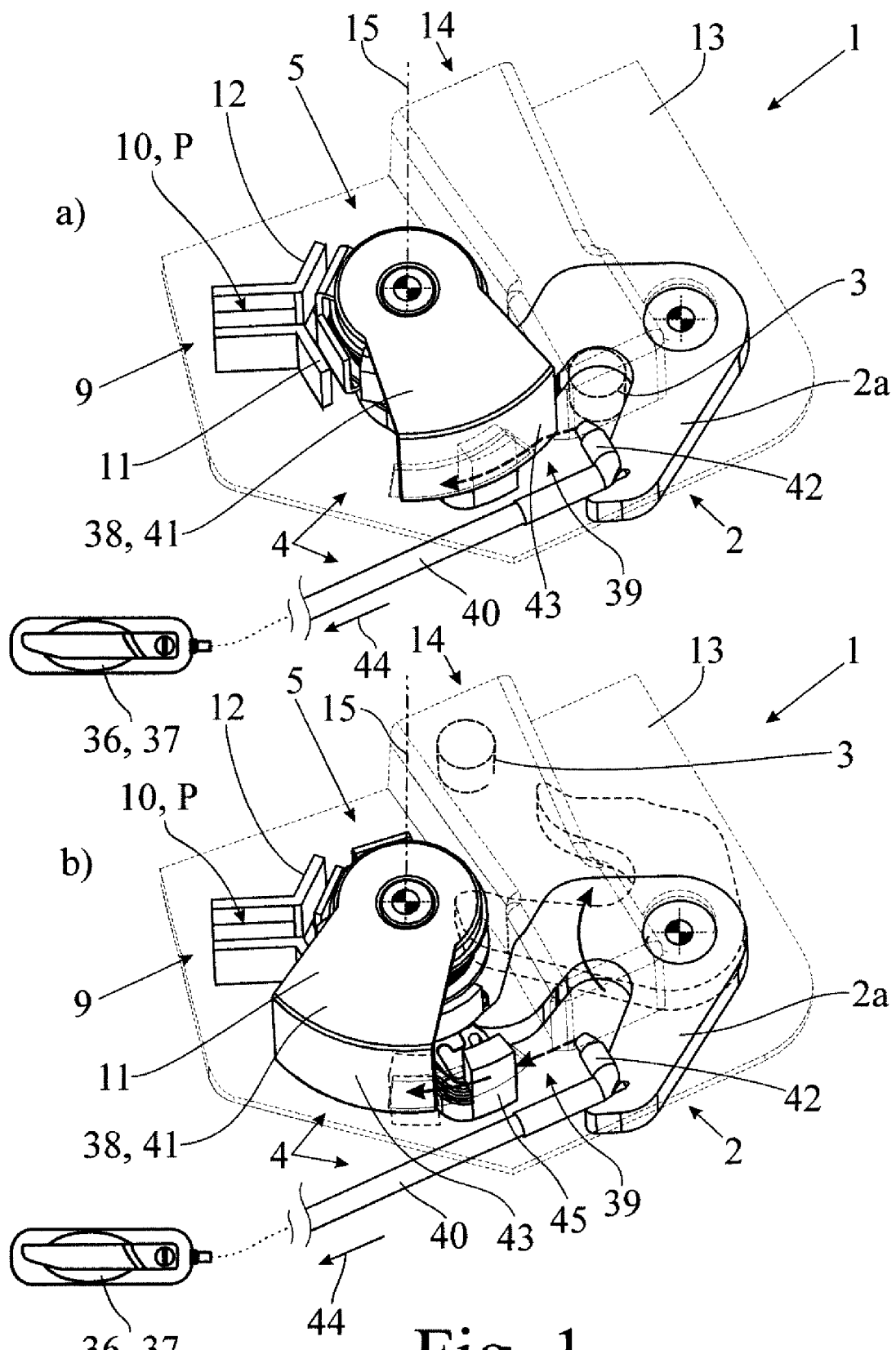
FIG. 1 shows a proposed motor vehicle lock a) in the lock state "locked" and b) in the lock state "unlocked", each in a perspective view.

The motor vehicle lock 1 shown in the drawing is used to produce a holding connection between a motor vehicle door 1 or the like and a motor vehicle body. The term "motor vehicle door" is to be interpreted broadly in this case. It comprises swing doors and sliding doors, in particular side doors, rear doors, trunk lids, tailgates, motor hoods or the like.

The motor vehicle lock 1 is equipped with a locking mechanism 2, which can have the usual closing elements lock latch 2a and pawl 2b. The lock latch 2a can be brought into a closed position shown in FIG. 1, in which it is fixed by the pawl 2b and in which it is in holding engagement with a closing part 3, in particular with a striker, a locking pin or the like. In this case, the motor vehicle lock 1 can be arranged on the motor vehicle door and the closing part 3 on the motor vehicle body. This is also conceivable vice versa.

The motor vehicle lock 1 is further equipped with a lock mechanism 4 which can be brought into different lock states such as "locked", "unlocked" or the like. Depending on the lock state, the motor vehicle lock 1 can be opened in the installed state from the inside or from the outside, as will be explained.

In the present case, the setting of different lock states of the lock mechanism 4 by means of an electrical setting arrangement 5 is paramount. In this case, the structural design of the setting arrangement 5 is of particular importance.

The setting arrangement 5 has a rotor arrangement 6, with which a rotor 7 and a rotor magnet arrangement 8 for generating a rotor magnetic field is associated. The rotor 7 can be designed of a soft magnetic material, so that the rotor magnetic field is guided via the rotor 7.

The setting arrangement 5 further has a stator 9, with which a stator magnet arrangement 10 for generating a stator magnetic field is associated. The structure of the stator 9 can best be seen from the illustration according to FIG. 4.

The stator 9 forms at least two magnetic, unlike stator poles 11, 12 of the stator magnet arrangement 10. The term "unlike" is based on the fact that a magnetic pole is always a north pole or a south pole. If two poles are each a north pole or each a south pole, they are like poles. If, on the other hand, one pole is a north pole and the other pole is a south pole, then these are unlike poles.

At least one of the magnet arrangements, that is, the rotor magnet arrangement 8 and the stator magnet arrangement 10, is associated with a coil arrangement S which can be supplied current for generating the respective magnetic field. It can be seen from the illustration according to FIG. 3 that here the rotor magnet arrangement 8 has the coil arrangement S. A drive torque to the rotor 7 and thus an adjustment of the rotor 7 in a predetermined number of actuator positions can be generated by supplying current to the coil arrangement S and a yet to be explained, resulting magnetic interaction between the rotor 7 and stator 9. This means that the number of actuator positions that can be racked in is limited, so that the setting arrangement 5 operates in the manner of a stepper motor in the broadest sense.

As shown in the drawing, both the rotor magnet arrangement 8 and the stator magnet arrangement 10 are stationarily fixed to a support section 13 of the motor vehicle lock 1. The support section 13 is here a lock housing section, which further can also provide an infeed section 14 for the closing part 3.

The rotor 7 is pivotable about a rotor axis 15 relative to the support section 13 and relative to the rotor magnet arrangement 8, as is apparent from an overview of Fig. a) and Fig. b). Due to the fact that the rotor 7 forms at least two unlike rotor poles 16, 17, 18 due to its magnetic coupling with the rotor magnet arrangement 8, these are accordingly likewise pivotable about the rotor axis 15. Therefore, the position of the rotor poles 16, 17, 18 can also be changed with a change in the rotor position.

Different design options are conceivable for the fixing of the rotor magnet arrangement 8. Here, the rotor magnet arrangement 8 is fixed to the support section 13 via bearing blocks 19, 20.

It can further be seen from the drawing that the position of the rotor 7 relative to the stator 9 is defined only by the fixing of rotor 7 and stator 9 on the support section 13. In that regard, rotor 7 and stator 9 are fixed separately from each other on the support section 13 and in particular without a housing to the support section 13.

Figure 2:
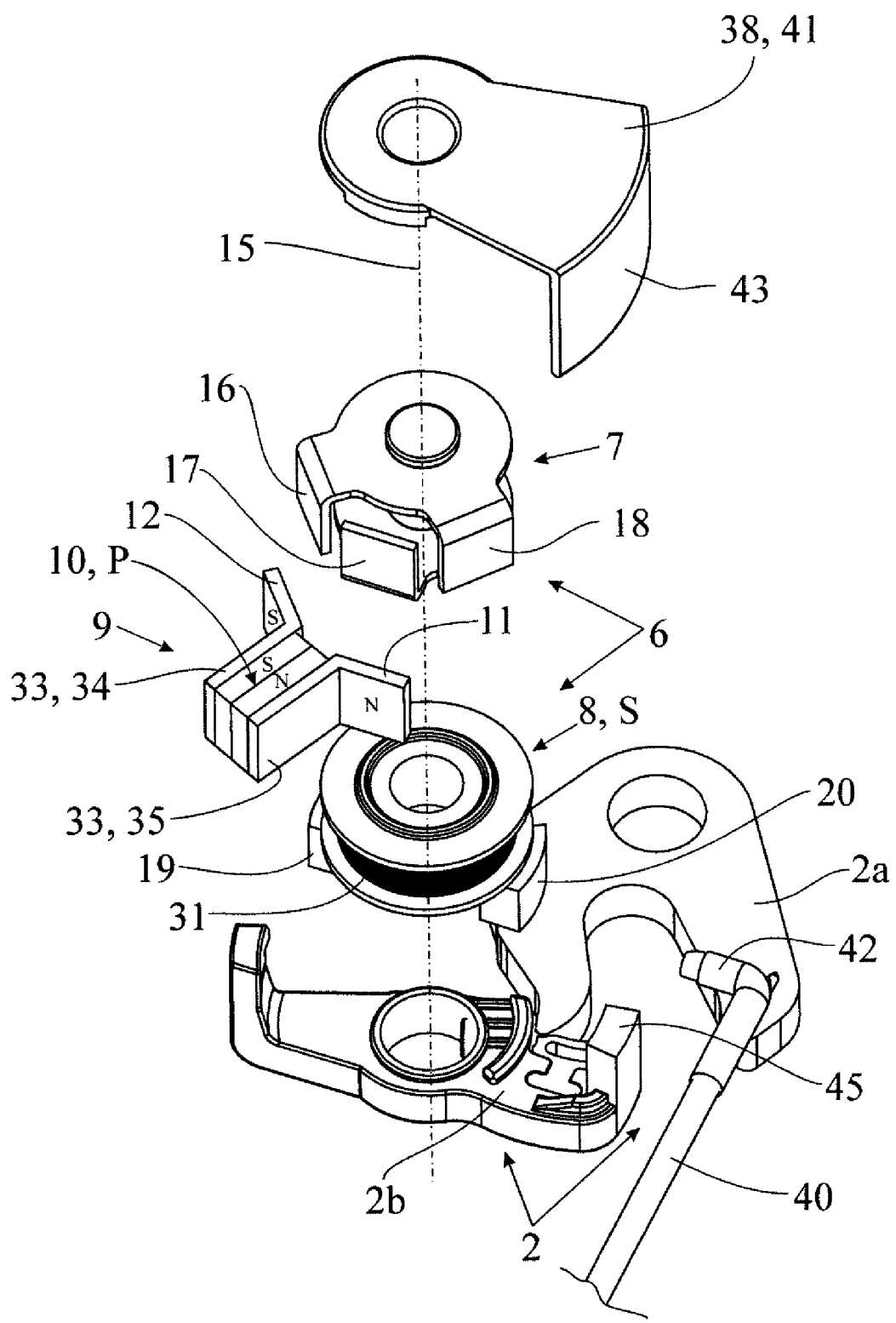
FIG. 2 shows the motor vehicle lock according to FIG. 1 in an exploded view.

Different advantageous variants are conceivable for the structural design of the setting arrangement 5. Here, as mentioned above, the rotor magnet arrangement 8 has the coil arrangement S for generating the rotor magnetic field, while the stator magnet arrangement 10 has a permanent magnet arrangement P for generating the stator magnetic field. The coil arrangement S, on the one hand, and the permanent magnet arrangement P, on the other hand, can be seen in the illustration according to FIG. 2. Alternatively, but not shown here, it can be advantageous for the stator magnet arrangement 10 to have a coil arrangement S for generating the stator magnetic field, while the rotor magnet arrangement 8 has a permanent magnet arrangement P for generating the rotor magnetic field.

The current supply of the coil arrangement S can be done in different ways. The current supply here can originate from a pulsed or unpulsed direct current voltage or the like. If the coil arrangement comprises a plurality of magnetic coils which can be supplied current separately, the current supply can be varied not only in the current supply direction but also in the selection of the magnetic coils that are supplied current.

Figure 4:
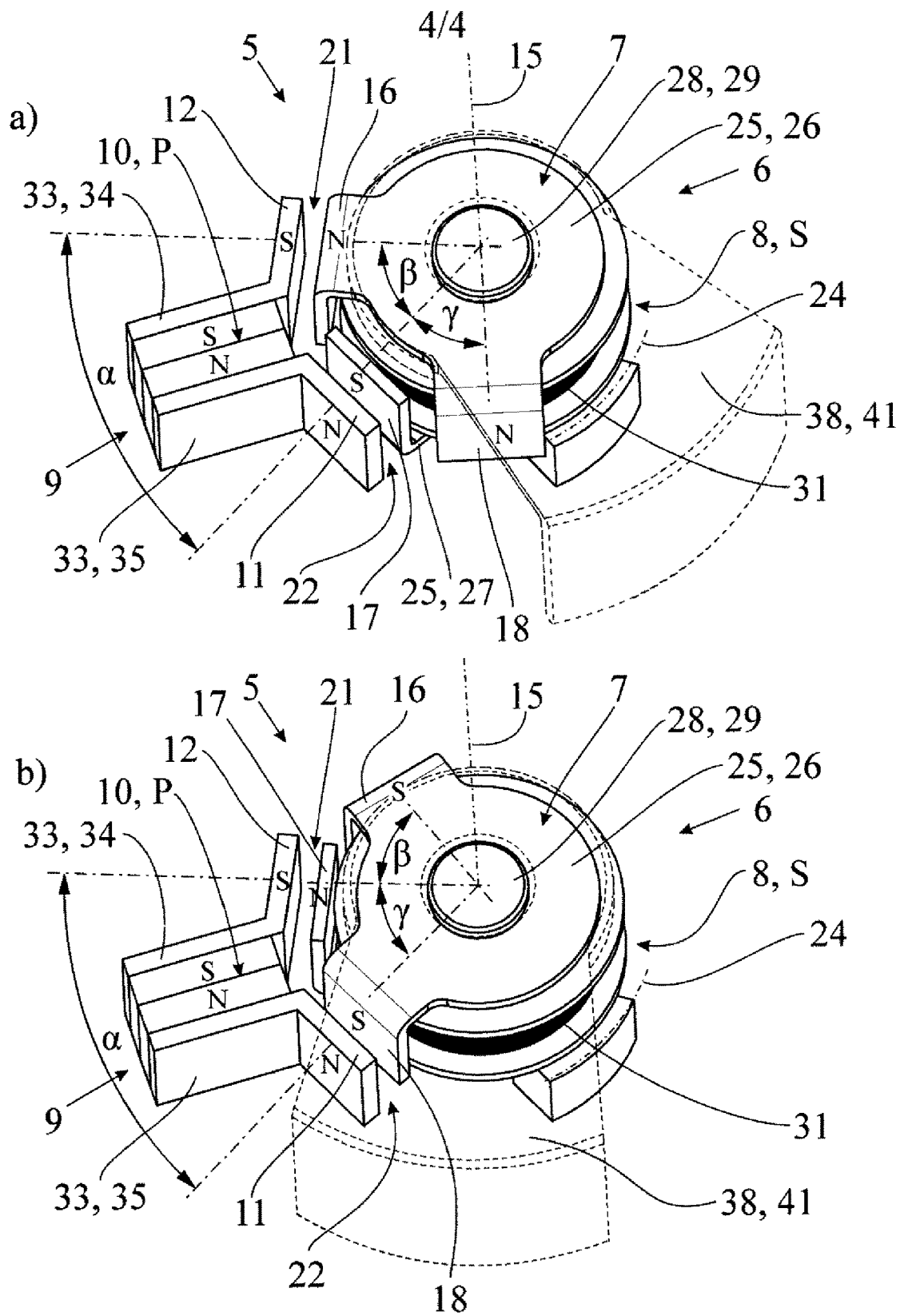

Here, the possible current supply variants are limited for lack of a plurality of magnetic coils that can be supplied current separately on the reversal of the current supply direction. Two current supply variants different in this sense for the coil arrangement S are shown in FIG. 4. The current supply variants shown in FIG. 4 are provided in opposite directions. This means that the current supply directions are opposite here.

Figure 3:
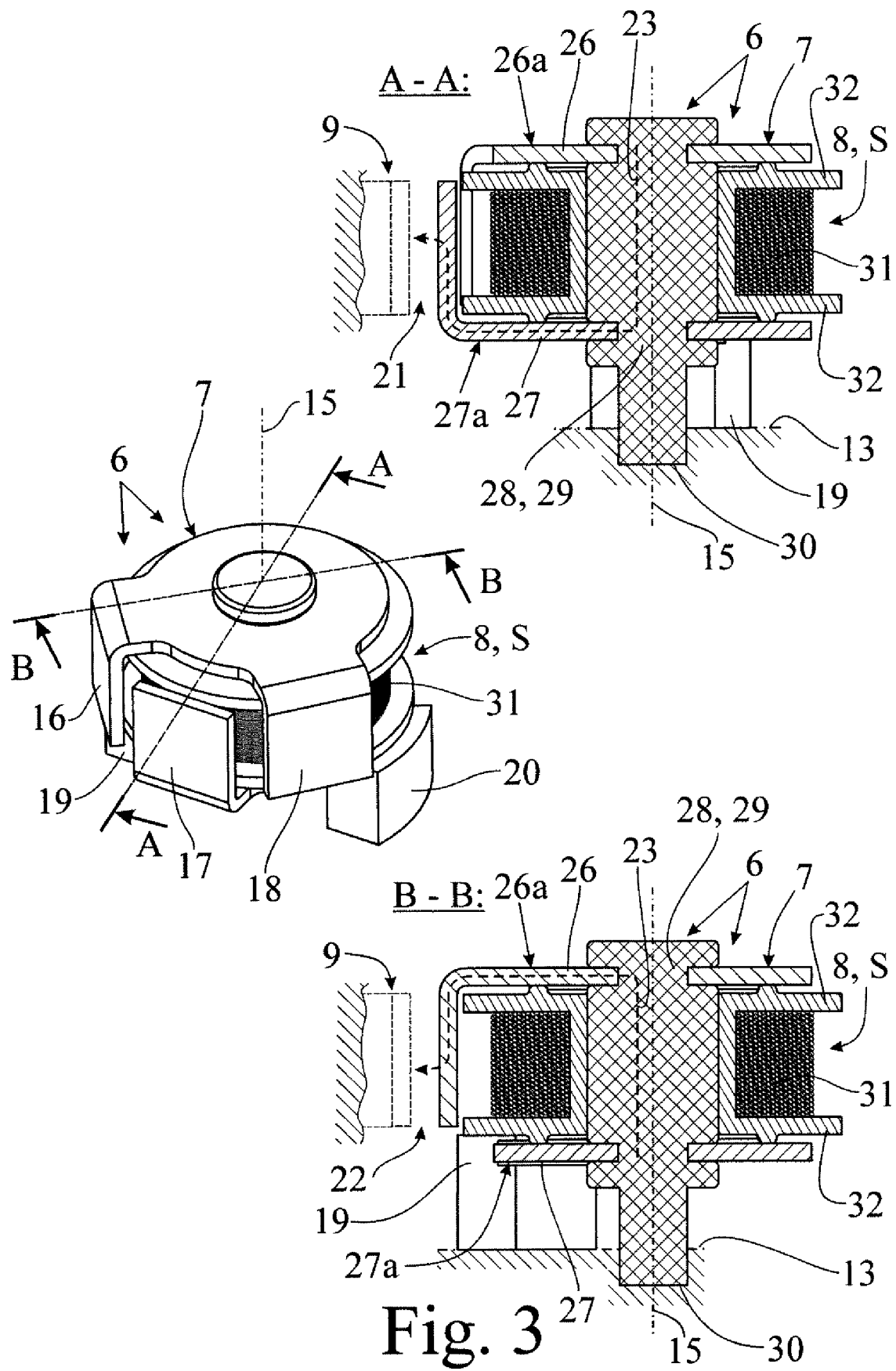
FIG. 3 shows the rotor arrangement of the setting arrangement of the motor vehicle lock as such according to FIG. 1 in a perspective view and in two sectional views and FIG. 4 shows the setting arrangement of the motor vehicle lock according to FIG. 1 as such a) in the lock state "locked" and b) in the lock state "unlocked", each in a perspective view.

In the current supply variant according to FIG. 4a, the rotor poles 16, 18 are north poles and the rotor pole 17 is a south pole of the rotor magnet arrangement 8. The stator pole 11 is here a north pole, while the stator pole 12 is a south pole. During a supply of current to the coil arrangement S, the unlike poles 16, 12; 17, 11 of the rotor 7 on the one hand and of the stator 9 on the other hand approach each other up to a respective magnetic gap 21, 22 by an adjustment of the rotor 7, whereby they close a magnetic circuit associated with the actuator position shown in FIG. 4a for the superposition field of rotor field and stator field. FIG. 3 shows the magnetic flux 23 of the superposition field for the current supply variant according to FIG. 4a.

Simplified, the above adjustment of the rotor 7 can be established so that the unlike poles 16, 12; 17, 11 attract until the respective magnetic gap 21, 22 has become minimal. In the position shown in FIG. 4a, the state of minimum magnetic potential energy has been reached, so that the local actuator position is a magnetically stable actuator position in the above sense.

Now, if the current supply direction is reversed, then the state shown in FIG. 4b results. The reversal of the current supply direction causes the rotor poles 16, 18 each to be south poles and the rotor pole 17 to be a north pole. In the above, simplified consideration, this results in the unlike poles 17, 12; 18, 11 attracting, while the like poles 16, 12 and 17, 11 repel. As a result, the unlike poles 17, 12; 18, 11 of the rotor 7 and stator 9 approach each other up to a respective magnetic gap 21, 22 by an adjustment of the rotor 7, by which in turn a magnetic circuit associated with this second actuator position for the superposition field of rotor field and stator field is closed. Also, with the actuator position shown in FIG. 4b, the above-mentioned state of minimum magnetic potential energy is generated, so that this actuator position is also a magnetically stable actuator position.

According to the above explanation, it is thus that different actuator positions, which are racked in by supplying current to the coil arrangement S, are associated with different magnetic circuits for the superposition field of rotor field and stator field. This results from the fact that different rotor poles 16, 17, 18 form a respective magnetic gap 21, 22 with the stator poles 11, 12 depending on the rotor position.

An interesting feature in the illustrated exemplary embodiment is further that in each actuator position with the current supply switched off, the magnetic field of the permanent magnet arrangement P, here the stator field, passes through the magnetic circuit associated with the respective actuator position. This means that even when the current supply is switched off, there is a magnetically stable actuator position, which originates solely from the stator magnetic field, in this case the magnetic field of the permanent magnet arrangement P. In that regard, there is a kind of latching fixing of the rotor 7 in the actuator positions, so that it is possible to dispense with detent springs or the like for a corresponding fixing of the rotor 7.

A different number of actuator positions can be set depending on the design of the proposed setting arrangement 5. In general, it can be provided that the setting arrangement 5 as such, depending on the current supply, thus by appropriate current supply, of the coil arrangement S, can rack in at least two, such as at least three, magnetically stable actuator positions through the resulting drive torque. In the illustrated embodiment, the setting arrangement 5 racks in as such as explained above exactly two magnetically stable actuator positions with opposite current supply by the resulting drive torque. This allows, for example, the lock states "locked" and "unlocked" to be implemented with minimal design effort.

In particular, for the implementation of only two actuator positions, it can be provided that the rotor 7 forms three rotor poles 16, 17, 18 of the rotor magnet arrangement 8, of which only two rotor poles 16, 18 are like, while the stator 9 forms two unlike stator poles 11, 12 of the stator magnet arrangement 10. In this case, the angular distance α with respect to the rotor axis 15 between the stator poles 11, 12 corresponds to the angular distance β,γ between two juxtaposed rotor poles 16, 17; 17, 18, wherein it can be assumed that the angular distances β,γ can be identical to one another. By this coordination of the angular distances α, β,γ to each other, there is basically the possibility that in a first actuator position shown in Fig. a), the poles 16, 12; 17, 11 each form a magnetic gap 21, 22 and that in a second actuator position, the poles 17, 12; 18, 11 each form a magnetic gap 21, 22.

The rotor poles 16, 17, 18 are arranged distributed over at least part of the circumference of the rotor 7, as can be seen from the illustration in FIG. 4. With respect to the rotor axis 16, 17, 18, they are aligned radially insofar as the magnetic field lines emerging from the rotor poles 16, 17, 18 are likewise aligned radially. Alternatively, it is also conceivable that the rotor poles 16, 17, 18 are axially aligned with respect to the rotor axis 15.

The above mode of operation of the proposed setting arrangement 5 allows the rotor poles 16, 17, 18 of the rotor magnet arrangement 8 to be arranged distributed over an angular range of less than 180°, such as of less than 120°, with respect to the rotor axis 15. A further weight reduction can be achieved with this design of the rotor 7 that is reduced and aligned to the position of the actuator positions.

A similar situation arises at the stator poles 11, 12 of the stator magnet arrangement 10. It should first of all be pointed out that in the illustrated embodiment, the stator poles 11, 12 are also radially aligned in the above sense. Alternatively, it can also be provided here that an axial alignment of the stator poles 11, 12 is realized, provided that the rotor poles 16, 17, 18 are likewise accordingly aligned axially.

The stator poles 11, 12 of the stator magnet arrangement 10 are, as shown in FIG. 4, arranged distributed along at least part of a movement path 24 of the rotor 7. In this case, a reduced design results in that the stator poles 11, 12 of the stator magnet arrangement 10 are arranged distributed over an angular range of less than 180° and, in various embodiments, of less than 120° with respect to the rotor axis 15. Also with this reduced design, there is a further overall reduction in weight for the motor vehicle lock 1.

The proposed setting arrangement 5 can be designed asymmetrically in large parts, which is ultimately a consequence of the adaptation of the setting arrangement 5 to the particular application. Accordingly, the stator magnet arrangement 10 may be designed and/or arranged asymmetrically with respect to the rotor axis 15. Alternatively or additionally, the rotor magnet arrangement 8 can be designed/arranged asymmetrically with respect to the rotor axis 15. This asymmetry limits the universal applicability of the setting arrangement 5 in favor of a weight-reduced and cost-effective arrangement. However, it can be seen from the drawing that the proposed setting arrangement 5 can be set to completely different actuator positions in that the rotor 7 on the one hand and the stator 9 on the other hand are redesigned. This redesign can be implemented particularly easily when the rotor 7 has a rotor lamination arrangement 25 shown in the drawing, which arrangement is magnetically coupled to the rotor magnet arrangement 8 and which forms the rotor poles 16, 17, 18.

FIG. 3 shows that the rotor lamination arrangement 25 for the formation of unlike rotor poles 16, 18 has two rotor laminations 26, 27, which are magnetically coupled to each other via a coupling part 28 aligned to the rotor axis 15, here a coupling pin 29. For this purpose, the two rotor laminations 26, 27 are riveted, welded or the like to the coupling part 28.

The basic structure of the rotor laminations 26, 27 consists in that the rotor laminations 26, 27 each have a base body 26a, 27a which extends essentially transversely to the rotor axis 15 and from which the rotor poles 16, 17, 18 are bent like a claw. Such a claw-like design of the rotor poles 16, 17, 18 is known from the field of claw pole motors.

The coupling part 28, which is designed here as a coupling pin 29, forms part of a pivot bearing 30 for the rotor 7. This double use of the coupling part 28 leads to an overall particularly compact design.

As shown in FIG. 3, the coil arrangement S has at least one, here exactly one magnetic coil 31 of the rotor magnetic coil 8 stationarily fixed to the support section 13, which magnetic coil is aligned coaxially with the rotor axis 15. This results in a magnetomotive force of the coupling part 28, from which the rotor field in turn results.

It is structurally provided that the coupling part 28 penetrates the magnetic coil 31 of the rotor magnet arrangement. It is in the illustrated embodiment further that the magnetic coil 31 is engaged with the coupling part 28 except for a certain clearance. Further, the two rotor laminations 26, 27 of the rotor 7 are arranged on opposite end faces 32 of the magnetic coil 31. This results in the above-mentioned function of the rotor 7 in the manner of a yoke.

A similar way of guiding the magnetic field can be provided for the stator 9. Accordingly, the stator 9 can have a stator lamination arrangement 33, which is magnetically coupled to the stator magnet arrangement 10 and which forms the stator poles 11, 12.

Both the rotor lamination arrangement 25 and the stator lamination arrangement 31 can be manufactured in a particularly simple manner in the illustrated embodiment. This is in particular true for the realization of the rotor poles 16, 17, 18 and the stator poles 11, 12, since they are designed completely flat. As a result, the rotor poles 16, 17, 18 and the stator poles 11, 12 can be readily generated by bending the relevant lamination. For the avoidance of stray fluxes, however, it may be provided that the magnetic gaps 21, 22 each have an identical gap width over the entire magnetic gap 21, 22. For this purpose, it is proposed that the rotor poles 16, 17, 18 and the stator poles 11, 12 are designed to be circular in cross-section, viewed transversely to the rotor axis 15.

In the illustrated exemplary embodiment, the stator lamination arrangement 33 has two stator laminations 34, 35 which form the stator poles 11, 12. For this purpose, the stator laminations 34, 35 are magnetically coupled accordingly to the permanent magnet arrangement P. This results in the advantage that the permanent magnet arrangement P as such does not have to be aligned with the rotor 7, but rather that this alignment can be accomplished via the stator laminations 34, 35. In that regard, the permanent magnet arrangement P can be equipped with flat pole faces for the discharge of the magnetic field regardless of the specific design of the setting arrangement 5. The alignment and arrangement of the stator poles 11, 12 can then be realized via the stator lamination arrangement 33 as mentioned above. The simplification of the integration of the permanent magnet arrangement P results in a further cost reduction.

Numerous advantageous variants are conceivable for the design of the lock mechanism 4. In general, it is thus that in the assembled state, the motor vehicle lock 1 is coupled to an actuation handle 36, in particular to a door outer handle 37 or a door inner handle, wherein the locking mechanism 2 is openable or not openable by an actuation of the actuation handle 36 depending on the lock state of the lock mechanism 4. The opening of the locking mechanism 2 takes place here by a lifting out of the pawl 2b from the situation shown in FIG. 1b.

Quite generally, the lock mechanism 4 has a functional element 38 which can be brought into different functional positions to set different lock states. In this case, the functional element 38 can be coupled to the rotor 7, here connected to the rotor 7 or even formed by the rotor 7. For example, the functional element 38 can be a lever made of soft magnetic material on which the rotor poles 16, 17, 18 are formed.

The lock mechanism 4 shown in FIG. 1 is applicable in a particularly advantageous manner with the proposed setting arrangement 5. The lock mechanism 4 here has a coupling arrangement 39 for the switchable coupling of an actuating element 40 with the locking mechanism 2, here with the pawl 2b of the locking mechanism 2. In this case, the coupling arrangement 39 has an adjustable coupling element 41 as an above-mentioned functional element, which can be adjusted depending on the lock state being set. The actuating element 40 can be coupled to an actuation handle 36, in particular to the door outer handle 37, provided that the motor vehicle lock 1 is assembled. The actuating element 40 can be an actuator rod provided with an engagement formation 42. Depending on the lock state, the actuating element 40 can be brought into coupling engagement with the locking mechanism 2 in order to lift the lock latch 2b.

The term "coupling engagement" is here interpreted broadly and also comprises such an interaction between the actuating element 40 and the locking mechanism 2, in which an intermediate element or a plurality of intermediate elements is or are interposed. In that regard, the coupling engagement can be an indirect engagement or a direct engagement between the actuating element 40 and the locking mechanism 2. In the present case, there is direct engagement, in which the engagement formation 42 of the actuating element 40 according to FIG. 1b comes into engagement with a counter-formation 45 on the pawl 2b of the locking mechanism 2. This results in a lifting of the pawl 2b and as a result opening of the locking mechanism 2 overall.

In the illustrated embodiment of the coupling arrangement 39, the coupling element 41 has a guide surface 43 which deflects, at least in one position of the coupling element 41, the actuating movement of the actuating element 40 out of coupling engagement with the locking mechanism 2 or into coupling engagement with the locking mechanism 2. In some embodiments, this deflection comprises a change in the movement direction of the actuating element 40.

As a result, the locking mechanism 2 in the lock state "unlocked", which is shown in FIG. 1b, can be opened by an actuation of the actuating element 40, since a deflection of the actuating movement of the actuating element 40 does not take place. If, on the other hand, the lock mechanism 4 is in the lock state "locked", then the situation shown in FIG. 1a results, in which the guide surface 43 deflects the actuating movement of the actuating element 40 out of coupling engagement with the locking mechanism 2.

It is further interesting in the case of the lock mechanism 4 shown in FIG. 1, that the actuating element 40 is always free of the guide surface 43 of the coupling element 41 prior to its actuation, thus in the unactuated state in FIG. 1. An adjustment of the coupling element 41 is thus unimpeded by the actuating element 40 and as a result possible with low power input. As a result, the setting arrangement 5, which is used to adjust the coupling element 41, can be designed for the low power input, which in turn leads to a weight reduction and simultaneously to a cost reduction.

Finally, it may be noted that there are a number of constructive variants for the setting arrangement 5, which can be advantageous depending on the application, but are not shown in the drawing. For example, a largely arbitrary design and arrangement, in particular magnetic alignment, of the permanent magnet arrangement P of the stator magnet arrangement 10 is conceivable, provided that the stator lamination arrangement 33 as a result ensures a corresponding alignment of the stator poles 11, 12.

Further, in the illustrated exemplary embodiment, a magnetic field is respectively provided in the magnetic gaps 21, 22, which magnetic field is aligned essentially radially with respect to the rotor axis 15. Alternatively, however, it can be provided, as already indicated, that the rotor poles 16, 17, 18 and the stator poles 11, 12 are aligned so that in the magnetic gaps 21, 22, an axial magnetic field with respect to the rotor axis 15 respectively results. Other advantageous designs are conceivable within the scope of the proposed teaching.

The invention claimed is:

1. A motor vehicle lock comprising:
 a locking mechanism,
 a lock mechanism, and
 an electrical setting arrangement for setting different lock states of the lock mechanism,
 wherein the electrical setting arrangement has a rotor arrangement, with which a rotor and a rotor magnet arrangement for generating a rotor magnetic field is associated, and a stator, with which a stator magnet arrangement for generating a stator magnetic field is associated, wherein the stator forms at least two magnetic, unlike stator poles of the stator magnet arrangement, wherein at least one of the magnet arrangement is associated with a coil arrangement that is configured to be supplied current to generate the respective magnetic field, wherein by supplying current to the coil arrangement and a resulting magnetic interaction between the rotor and the stator, a drive torque to the rotor and thus an adjustment of the rotor is configured to be generated in a predetermined number of actuator positions,
 wherein, the rotor magnet arrangement and the stator magnet arrangement are stationarily fixed to a support section of the motor vehicle lock, and wherein the rotor is pivotable about a rotor axis relative to the support section, relative to the stator magnet arrangement and relative to the rotor magnet arrangement and forms at least two magnetic, unlike rotor poles of the rotor magnet arrangement, which are respectively pivotable about the rotor axis,
 wherein the electrical setting arrangement as such, when opposite current is supplied, racks in exactly two magnetically stable actuator positions by the resulting drive torque.

2. The motor vehicle lock as claimed in claim 1, wherein the rotor magnet arrangement has the coil arrangement for generating the rotor magnetic field and the stator magnet arrangement has a permanent magnet arrangement for generating the stator magnetic field, or wherein the stator magnet arrangement has the coil arrangement for generating the stator magnetic field and the rotor magnet arrangement has a permanent magnet arrangement for generating the rotor magnetic field.

3. The motor vehicle lock as claimed in claim 2, wherein in each actuator position when a current supply is switched off, a magnetic field of the permanent magnet arrangement passes through a magnetic circuit associated with the respective actuator position, so that the respective actuator position is a magnetically stable actuator position even when the current supply is switched off.

4. The motor vehicle lock as claimed in claim 1, wherein when current is supplied to the coil arrangement, unlike poles of the rotor on the one hand and of the stator on the other hand approach each other up to a respective magnetic gap by an adjustment of the rotor and thereby close a magnetic circuit associated with the respective actuator position for a superposition field of rotor field and stator field.

5. The motor vehicle lock as claimed in claim 4, wherein different actuator positions are associated with different magnetic circuits for the superposition field of rotor field and stator field.

6. The motor vehicle lock as claimed in claim 1, wherein the electrical setting arrangement as such, depending on a current supply to the coil arrangement, can rack in at least two magnetically stable actuator positions by the resulting drive torque.

7. The motor vehicle lock as claimed in claim 1, wherein the at least two magnetic, unlike rotor poles are arranged distributed over at least a part of the circumference of the rotor, and/or the at least two magnetic, unlike rotor poles of the rotor magnet arrangement are arranged distributed over an angular range of less than 180° with respect to the rotor axis.

8. The motor vehicle lock as claimed in claim 1, wherein the at least two magnetic, unlike stator poles of the stator magnet arrangement are arranged distributed along at least part of a movement path of the rotor.

9. The motor vehicle lock as claimed in claim 8, wherein the at least two magnetic, unlike stator poles of the stator magnet arrangement are arranged distributed along only a part of a movement path of the rotor.

10. The motor vehicle lock as claimed in claim 9, wherein the at least two unlike stator poles of the stator magnet arrangement are arranged distributed over an angular range of less than 180° with respect to the rotor axis.

11. The motor vehicle lock as claimed in claim 1, wherein the stator magnet arrangement is designed and/or arranged asymmetrically with respect to the rotor axis, and/or the rotor magnet arrangement is designed and/or arranged asymmetrically with respect to the rotor axis.

12. The motor vehicle lock as claimed in claim 1, wherein the coil arrangement has at least one magnetic coil of the rotor magnet arrangement stationarily fixed to the support section, which the magnetic coil is aligned coaxially with the rotor axis.

13. The motor vehicle lock as claimed in claim 1, wherein in an assembled state, the motor vehicle lock is coupled to an actuation handle depending on a lock state of the lock mechanism, is configured to be opened by an actuation of the actuation handle, wherein the lock mechanism has a functional element which is configured to be brought into different functional settings to set different lock states and wherein the functional element is coupled to the rotor.

14. The motor vehicle lock as claimed in claim 1, wherein the lock mechanism has a coupling arrangement for a switchable coupling of an actuating element to the locking mechanism, in particular with a locking pawl of the locking mechanism and wherein the coupling arrangement has an adjustable coupling element as a functional element.

15. A motor vehicle lock comprising:
 a locking mechanism, a lock mechanism, and
an electrical setting arrangement for setting different lock states of the lock mechanism,
wherein the electrical setting arrangement has a rotor arrangement, with which a rotor and a rotor magnet arrangement for generating a rotor magnetic field is associated, and a stator, with which a stator magnet arrangement for generating a stator magnetic field is associated, wherein the stator forms at least two magnetic, unlike stator poles of the stator magnet arrangement, wherein at least one of the magnet arrangement is associated with a coil arrangement that is configured to be supplied current to generate the respective magnetic field, wherein by supplying current to the coil arrangement and a resulting magnetic interaction between the rotor and the stator, a drive torque to the rotor and thus an adjustment of the rotor is configured to be generated in a predetermined number of actuator positions,
wherein, the rotor magnet arrangement and the stator magnet arrangement are stationarily fixed to a support section of the motor vehicle lock, and wherein the rotor is pivotable about a rotor axis relative to the support section, relative to the stator magnet arrangement and relative to the rotor magnet arrangement and forms at least two magnetic, unlike rotor poles of the rotor magnet arrangement, which are respectively pivotable about the rotor axis,
wherein the rotor magnet arrangement has the coil arrangement for generating the rotor magnetic field and the stator magnet arrangement has a permanent magnet arrangement for generating the stator magnetic field, or wherein the stator magnet arrangement has the coil arrangement for generating the stator magnetic field and the rotor magnet arrangement has a permanent magnet arrangement for generating the rotor magnetic field,
wherein in each actuator position when a current supply is switched off, a magnetic field of the permanent magnet arrangement passes through a magnetic circuit associated with the respective actuator position, so that the respective actuator position is a magnetically stable actuator position even when the current supply is switched off.

16. A motor vehicle lock comprising:
a locking mechanism,
a lock mechanism, and
an electrical setting arrangement for setting different lock states of the lock mechanism,
wherein the electrical setting arrangement has a rotor arrangement, with which a rotor and a rotor magnet arrangement for generating a rotor magnetic field is associated, and a stator, with which a stator magnet arrangement for generating a stator magnetic field is associated, wherein the stator forms at least two magnetic, unlike stator poles of the stator magnet arrangement, wherein at least one of the magnet arrangement is associated with a coil arrangement that is configured to be supplied current to generate the respective magnetic field, wherein by supplying current to the coil arrangement and a resulting magnetic interaction between the rotor and the stator, a drive torque to the rotor and thus an adjustment of the rotor is configured to be generated in a predetermined number of actuator positions,
wherein, the rotor magnet arrangement and the stator magnet arrangement are stationarily fixed to a support section of the motor vehicle lock, and wherein the rotor is pivotable about a rotor axis relative to the support section, relative to the stator magnet arrangement and relative to the rotor magnet arrangement and forms at least two magnetic, unlike rotor poles of the rotor magnet arrangement, which are respectively pivotable about the rotor axis,
wherein the rotor forms three rotor poles of the rotor magnet arrangement, of which only two rotor poles are like and wherein the stator forms two unlike stator poles of the stator magnet arrangement.

17. The motor vehicle lock as claimed in claim 16, wherein an angular distance between the two unlike stator poles with respect to the rotor axis corresponds to the angular distance between two juxtaposed rotor poles.

18. A motor vehicle lock comprising:
a locking mechanism,
a lock mechanism, and
an electrical setting arrangement for setting different lock states of the lock mechanism,
wherein the electrical setting arrangement has a rotor arrangement, with which a rotor and a rotor magnet arrangement for generating a rotor magnetic field is associated, and a stator, with which a stator magnet arrangement for generating a stator magnetic field is associated, wherein the stator forms at least two magnetic, unlike stator poles of the stator magnet arrangement, wherein at least one of the magnet arrangement is associated with a coil arrangement that is configured to be supplied current to generate the respective magnetic field,
wherein by supplying current to the coil arrangement and a resulting magnetic interaction between the rotor and the stator, a drive torque to the rotor and thus an adjustment of the rotor is configured to be generated in a predetermined number of actuator positions, wherein, the rotor magnet arrangement and the stator magnet arrangement are stationarily fixed to a support section of the motor vehicle lock, and wherein the rotor is pivotable about a rotor axis relative to the support section, relative to the stator magnet arrangement and relative to the rotor magnet arrangement and forms at least two magnetic, unlike rotor poles of the rotor magnet arrangement, which are respectively pivotable about the rotor axis,
wherein the rotor has a rotor lamination arrangement which is magnetically coupled to the rotor magnet arrangement and which forms the at least two magnetic, unlike rotor poles.

19. The motor vehicle lock as claimed in claim 18, wherein the rotor lamination arrangement has two rotor laminations for the formation of the at least two magnetic, unlike rotor poles, wherein the two rotor laminations are magnetically coupled to each another via a coupling part aligned on the rotor axis.

20. A motor vehicle lock comprising:
a locking mechanism,
a lock mechanism, and
an electrical setting arrangement for setting different lock states of the lock mechanism,
wherein the electrical setting arrangement has a rotor arrangement, with which a rotor and a rotor magnet arrangement for generating a rotor magnetic field is associated, and a stator, with which a stator magnet arrangement for generating a stator magnetic field is associated, wherein the stator forms at least two magnetic, unlike stator poles of the stator magnet arrangement, wherein at least one of the magnet arrangement is associated with a coil arrangement that is configured to be supplied current to generate the respective magnetic field, wherein by supplying current to the coil arrangement and a resulting magnetic interaction between the rotor and the stator, a drive torque to the rotor and thus an adjustment of the rotor is configured to be generated in a predetermined number of actuator positions, wherein, the rotor magnet arrangement and the stator magnet arrangement are stationarily fixed to a support section of the motor vehicle lock, and wherein the rotor is pivotable about a rotor axis relative to the support section, relative to the stator magnet arrangement and relative to the rotor magnet arrangement and forms at least two magnetic, unlike rotor poles of the rotor magnet arrangement, which are respectively pivotable about the rotor axis, and wherein the stator has a stator lamination arrangement which is magnetically coupled to the stator magnet arrangement and which forms the at least two magnetic, unlike stator poles.

\* \* \* \* \*